United States Patent
Lickfeldt et al.

(10) Patent No.: US 12,349,679 B2
(45) Date of Patent: Jul. 8, 2025

(54) COMBINATION OF PYROGLUTAMIC ACID AND A UREASE INHIBITOR FOR IMPROVED PLANT HEALTH EFFECTS

(71) Applicant: Verdesian Life Sciences U.S., LLC, Cary, NC (US)

(72) Inventors: Darin Lickfeldt, Cary, NC (US); Amy Burton, Fuquay-Varina, NC (US); Sandra Paa, Cary, NC (US); Nicholas William Vandervort, III, Cresco, IA (US)

(*) Notice: Subject to any disclaimer, the term of this patent is extended or adjusted under 35 U.S.C. 154(b) by 963 days.

(21) Appl. No.: 17/431,775

(22) PCT Filed: Feb. 21, 2020

(86) PCT No.: PCT/US2020/019256
§ 371 (c)(1),
(2) Date: Aug. 18, 2021

(87) PCT Pub. No.: WO2020/172550
PCT Pub. Date: Aug. 27, 2020

(65) Prior Publication Data
US 2022/0110326 A1    Apr. 14, 2022

Related U.S. Application Data

(60) Provisional application No. 62/809,026, filed on Feb. 22, 2019.

(51) Int. Cl.
*A01N 57/28* (2006.01)
*A01N 43/36* (2006.01)
*A01P 21/00* (2006.01)

(52) U.S. Cl.
CPC .......... *A01N 57/28* (2013.01); *A01N 43/36* (2013.01); *A01P 21/00* (2021.08)

(58) Field of Classification Search
CPC ................ A01N 43/36; A01N 57/28
See application file for complete search history.

(56) References Cited

U.S. PATENT DOCUMENTS

| | | | |
|---|---|---|---|
| 6,593,275 B1 | 7/2003 | Unkefer et al. | |
| 6,831,040 B1 | 12/2004 | Unkefer et al. | |
| 8,551,917 B2 | 10/2013 | Unkefer et al. | |
| 8,802,595 B2 | 8/2014 | Unkefer et al. | |
| 9,446,992 B2 * | 9/2016 | Unkefer | C05F 11/00 |
| 2007/0105719 A1 | 5/2007 | Unkefer et al. | |
| 2015/0051072 A1 | 2/2015 | Unkefer | |
| 2017/0181435 A1 | 6/2017 | Nave et al. | |

FOREIGN PATENT DOCUMENTS

| | | |
|---|---|---|
| CN | 101365337 A | 2/2009 |
| JP | 2001-233690 A | 8/2001 |
| JP | 2012-530760 A | 12/2012 |
| JP | 2016-528249 A | 9/2016 |
| WO | 2018224966 A1 | 12/2018 |
| WO | 2020172550 A1 | 8/2020 |

OTHER PUBLICATIONS

AGROTAIN Ultra label, Koch Agronomic Services, 2018.*
Take Off LS Safety Data Sheet, Verdesian Life Sciences, LLC, 2018.*
Take Off brochure, Verdesian Life Sciences, LLC, 2013.*
Khan, A.Z., et al., The Journal of Animal & Plant Sciences, 2015, vol. 25, No. 3, pp. 679-685.
Espindula, Marcelo Curitiba et al., Revista Ceres, 2014, vol. 61, No. 2, pp. 273-279.
Potassium [online], [searched Nov. 20, 2023], Jan. 9, 2015<URL: https://www.sci.niihama-nct.ac.jp/PeriodicTable/elements/19.html>.
Dawar, K. et al., "Impact of Urease Inhibitor (NBPT) and Herbicide on Wheat Yield and Quality." Pak. J. Weed Science Research, 2011(17)2.
Official letter issued on Apr. 3, 2023, from Indonesian Patent Application No. P00202107832, 3 sheets.

* cited by examiner

*Primary Examiner* — John Pak
(74) *Attorney, Agent, or Firm* — Katten Muchin Rosenman LLP

(57) ABSTRACT

The subject matter described herein relates generally to compositions and formulations and methods of use of combinations of pyroglutamic acid and NBPT for improving plant health characteristics, such as crude protein yield and increasing percent nitrogen in plant tissue.

15 Claims, No Drawings

COMBINATION OF PYROGLUTAMIC ACID AND A UREASE INHIBITOR FOR IMPROVED PLANT HEALTH EFFECTS

FIELD OF THE INVENTION

The subject matter described herein relates generally to compositions and methods of use of combinations of pyroglutamic acid (PGA) and the urease inhibitor N-(n-butyl) thiophosphoric triamide (NBPT) for improving plant growth, health, and yields, and for protecting plants against selected stress conditions and for disease control.

CROSS-REFERENCE TO RELATED APPLICATIONS

This application is a U.S. National Stage Entry Application of International Application No. PCT/US2020/019256 filed Feb. 21, 2020, which claims the benefit of U.S. Provisional Patent Application 62/809,026 filed Feb. 22, 2019, each of which is herein incorporated by reference in its entirety for all purposes.

BACKGROUND

Rapid plant growth and yield maximization continues to be an economically important goal for many agricultural businesses that grow high-value crops such as vegetables, berries, and bananas, as well as for the greenhouse and nursery businesses. Rapid plant growth and yield maximization are goals because it is an important factor in timing, harvesting, and cost of production. As such, rapid plant growth and yield maximization are economically important goals for many agricultural businesses that grow high-value crops.

Application of nitrogen is a substantial cost in the production of horticultural and agronomic crops. Thus, a major area of agricultural research is manipulating nitrogen availability in the soil. While over the past several decades the use of agrichemicals has greatly enhanced agricultural productivity and yields, the importance of improved crop production technologies continues to increase. These crop production technologies will continue to evolve and will be informed by a growing understanding of plant metabolism.

Nitrogen use efficiency and the metabolism of carbon and nitrogen in photosynthetic organisms must be regulated in a coordinated manner to assure efficient use of plant resources and energy. In photosynthetic organisms, carbon metabolism begins with $CO_2$ fixation which includes two major processes termed C-3 and C-4 metabolism. In plants with C-3 metabolism, the enzyme ribulose bisphosphate carboxylase (RuBisCo) catalyzes the combination of $CO_2$ with ribulose bisphosphate to produce 3-phosphoglycerate, a three carbon compound (C-3) that the plant uses to synthesize carbon-containing compounds. In plants with C-4 metabolism, $CO_2$ is combined with phosphoenol pyruvate to form acids containing four carbons (C-4) in a reaction catalyzed by the enzyme phosphoenol pyruvate carboxylase. The acids are transferred to the bundle sheath cells where they are decarboxylated to release the $CO_2$ which is then combined with ribulose bisphosphate in the same reaction as employed by C-3 plants. In photosynthetic organisms, nitrogen is assimilated by the action of the enzyme glutamine synthetase which catalyzes the combination of ammonia with glutamate to form glutamine. Once nitrogen is assimilated, it is incorporated into the precursor for chlorophyll and amino acids during glutamate biosynthesis. Thus, increasing nitrogen assimilation can enhance growth and yields in plants.

Though productivity can be increased, it has become apparent that there are limits to the amount of nutrients and agrichemicals that can be added to plants and that can be safely absorbed into the environment. The increased demands on agricultural productivity creates environmental and economic requirements. This is particularly true with regard to the use of agrichemicals because of cost and safety. Thus, efficiency of agrichemicals is of particular importance because of the associated costs and the possible impact of agrichemicals on the environment and the health of humans and animals. So, while there is a desire for reduction of the amount of agrichemicals applied, the need for ever-increasing production remains.

What is therefore needed and addressed by the subject matter described herein is an improvement in plant growth, health, and yields.

SUMMARY OF THE INVENTION

In one aspect, the subject matter described herein is directed to a composition comprising pyroglutamic acid (PGA) and N-(n-butyl)-thiophosphoric triamide (NBPT), wherein the pyroglutamic acid and NBPT are present in synergistically effective amounts.

In another aspect, the subject matter described herein is directed to methods of increasing plant growth, yields, and health, and decreasing disease by contacting a composition comprising pyroglutamic acid and NBPT with the plant or soil in the area of the plant.

In another aspect, the subject matter described herein is directed to formulations suitable for use in agriculture, where the formulations comprise pyroglutamic acid, NBPT, and an agrinomically acceptable excipient.

In another aspect, the subject matter described herein is directed to methods of preparing the compositions and formulations.

These and other aspects are fully described below.

DETAILED DESCRIPTION

The presently disclosed subject matter will now be described more fully hereinafter. However, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims. In other words, the subject matter described herein covers all alternatives, modifications, and equivalents. In the event that one or more of the incorporated literature, patents, and similar materials differs from or contradicts this application, including but not limited to defined terms, term usage, described techniques, or the like, this application controls. Unless otherwise defined, all technical and scientific terms used herein have the same meaning as commonly understood by one of ordinary skill in this field. All publications, patent applications, patents, and other references mentioned herein are incorporated by reference in their entirety.

Nitrogen inputs represent a substantial proportion of costs in the production of horticultural and agronomic crops worldwide. In agricultural systems, the loss of plant-available nitrogen occurs in several ways, including breakdown or immobilization of nitrogen by soil microbes and free enzymes, volatilization to the atmosphere, and run-off or leaching to bodies of water. Changes in agronomic practice have improved nitrogen availability in the soil over the last several decades, but current and future demand for food require further innovation in crop nitrogen efficiency.

Nitrogen efficiency is limited both by the supply of plant-labile forms of nitrogen in the soil as well as by intrinsic biochemical limitations to plant metabolism. Substantial amounts of nitrogen are lost through breakdown by the ubiquitous soil enzyme urease. The urease enzyme inhibitor N-(n-butyl) thiophosphoric triamide (NBPT) is a urea fertilizer additive that reduces volatilization of nitrogen into the atmosphere, thereby allowing more of the nitrogen to remain available in the root zone. Once taken into the plant, nitrogen is then incorporated into the precursor for chlorophyll and into various amino acids during glutamate biosynthesis. Application of pyroglutamic acid (PGA) has been shown to improve growth and yield in crop plants by increasing nitrogen assimilation in the glutamate biosynthesis pathway.

As described herein, the combination of PGA and NBPT demonstrates synergy for several advantageous effects, including nitrogen use efficiency. Without being bound to theory, it is believed that the synergy results from allowing plant-available nitrogen inputs to persist in the soil for longer periods of time, and increasing the rate at which nitrogen is obtained by the plant and incorporated into vital biochemical elements (e.g., chlorophyll, enzymes, DNA, and membrane-embedded ion transporters). As such, the subject matter described herein addresses a two-fold problem of plant nitrogen use: 1) duration of availability in soil, and 2) rate of nitrogen assimilation into the plant. A result, as shown herein, is greater crude protein content in the grain. Higher crude protein in the grain is evidence of increased nitrogen uptake during the growing season. As disclosed herein, field trial and greenhouse data evidence that the combinations of pyroglutamic acid and NBPT provide at least one synergistic effect on plant health. In certain aspects, the PGA and NBPT combination is for use in crops, such as corn.

I. Definitions

As used herein, "plant" and "crop plant" includes cereals (such as wheat, barley, rye, triticale, sorghum/millet and oats), maize, soya, rice, potatoes, cotton, oilseed rape, fruit species (with the fruits including apples, pears, citrus fruit and grapes), sunflower, bean, coffee, beet (for example, sugar beet and fodder beet), peanut, poppy, olive, coconut, cocoa, sugar cane, tobacco, vegetables (such as tomato, cucumbers, onions and lettuce), turf and ornamentals. Plants of interest include plant species grown for the purposes of providing animal nutrition, including but not limited to various grasses and leguminous plants known to the art of animal nutrition. Such plants may either be harvested in various ways known to the art and subsequently used for animal nutrition, or the plants may be consumed (in whole or in part) by animals while the plants are still growing, or while they are still attached to soil. Plants of interest also include any plant used in productive agriculture and needing a nitrogen nutrient supply as these plants would benefit from the compositions described herein. Transgenic plants are also included.

The term "plant health" describes, for example, advantageous properties such as improved crop characteristics including, but not limited to nitrogen use efficiency, crude protein percentage yield, better emergence, increased crop yields, more favorable protein and/or content, more favorable amino acid and/or oil composition, more developed root system (improved root growth), tillering increase, increase in plant height, bigger leaf blade, less dead basal leaves, stronger tillers, greener leaf color, pigment content, photosynthetic activity, less fertilizers needed, less seeds needed, more productive tillers, earlier flowering, early grain maturity, less plant verse (lodging), increased shoot growth, enhanced plant vigor, increased plant stand or early germination; or a combination of at least two or more of the aforementioned effects or any other advantages familiar to a person skilled in the art. Improved plant health can be determined by an increase of one or more of the above characteristics as compared to control. The increase can be above about 5%, above about 10%, above about 15%, above about 20%, above about 25%, above about 30%, above about 35%, above about 40%, above about 45%, or above about 50%; or the improvement can be from about 5% to about 50%, or from about 5% to about 35%, or from about 5% to about 25%, or from about 5% to about 15%, or from about 7% to about 11%, or from about 8% to about 10%. In particular, the improvement can be the result of a synergistic effect.

The term "synergistic effect" means that the improvement in the development of the plant in relation to at least one effect is increased to an extent greater than that resulting from an additive effect. An additive effect is the expected effect due to each active compound acting individually. A synergistic effect occurs to a significantly greater degree than an additive effect. The expected activity for a given combination of two active compounds can be calculated as follows (cf. Colby, S. R., "Calculating Synergistic and Antagonistic Responses of Herbicide Combinations", *Weeds* 15, pages 20-22, 1967). The synergistic effect of the active ingredient combination used in accordance with the embodiments allows the total application rate of the substances to achieve the same effect to be reduced.

As used herein, the term "nitrogen-use efficiency" refers to the mass of agriculture produce per unit of nitrogen consumed and economically to the value of product(s) produced per unit of nitrogen consumed, reflecting uptake and utilization efficiency.

By the term "contact" or "contacting" it is intended to allow the compositions and formulations to come in physical communication with the plant or its surroundings, such as the soil adjacent or in the vicinity of the plant. Contacting can be by any conventional means.

Additional definitions are set forth herein below.

II. Combination Products

In embodiments, the subject matter described herein is directed to compositions comprising pyroglutamic acid and NBPT. The pyroglutamic acid and NBPT can be present in synergistic amounts. Without being bound to theory, embodiments of the combination compositions can provide a surprising increase in nitrogen use efficiency and/or nitrogen uptake by the plant.

Pyroglutamic acid (pyroglutamate) has the following stereochemical structures:

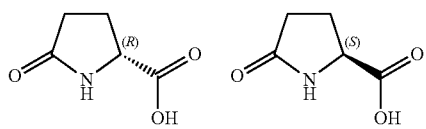

Pyroglutamic acid exists in two forms, the D and L stereoisomers. As such, pyroglutamic acid can be present in the combination products as D or L or a ratio of D:L. Embodiments of the compositions include those where the pyroglutamic acid is stereochemically enhanced or purified. The commercially available pyroglutamate, synthesized by a bacterial fermentation process, has a stereochemistry ratio of approximately 60:40 of the L isomer to the D isomer. In embodiments, the compositions described herein contain L and D isomers of pyroglutamate in various ratios and contribute to the efficacy of such compositions in promoting plant growth and yield, and resistance to stresses. The pyroglutamic acid can be in the forms described in U.S. Pat. Nos. 6,593,275; 6,831,040; 8,802,595; and 8,551,917, each of which is hereby incorporated by reference in its entirety.

In certain embodiments, the pyroglutamic acid is L-pyroglutamic acid. In certain embodiments, the pyroglutamic acid is a mixture of L- and D-pyroglutamic acid. In these embodiments, the ratio of L to D is from about 80:20 to about 97:3. In certain embodiments, the total pyroglutamic acid is supplied as a ratio of L to a mixture of D/L, such as, 3-4.5:1 (D:D/L). Derivatives of pyroglutamic acid include its salts. The neutral salt is the preferred derivative. In certain embodiments, PGA can be applied neat, or applied as a product known as TAKE-OFF™, for example, TAKE OFF BOOSTER™, where 1× Rate is the equivalent of 250 g PGA applied per hectare.

N-(n-butyl)-thiophosphoric triamide (NBPT) is a phosphoramide urease inhibitor. It has the following chemical structure:

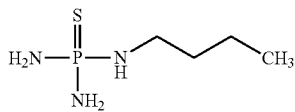

In certain embodiments, NBPT can be applied neat or applied as a product known as AGROTAIN ULTRA™, where 1× Rate as 0.1% v/v AI is ~1000 ppm; calculated as follows: AGROTAIN ULTRA™ field rate: 3.0 quarts Agrotain/ton granular urea=2.84 L/907 kg. NBPT A.I. in AGROTAIN ULTRA™: Concentration: 26.7% w/w; Density: 1.06 kg/L. NBPT A.I. applied at standard field rate: 2.839 L*1.06 kg/L=3.01 kg of AGROTAIN ULTRA™ applied per ton (1 ton=907 kg). Percent AGROTAIN ULTRA™ applied: 3.01 kg AGROTAIN ULTRA™/907 kg Urea=0.332% AGROTAIN ULTRA™. Quantity of active content: 0.332*0.267=0.0886% as NBPT=886 ppm, rounded up to 0.1% (i.e., 1000 ppm).

In embodiments, the compositions comprise pyroglutamic acid in an amount from about 12% w/w to about 36% w/w of the composition, or from about 15% w/w to about 33% w/w of the composition, or from about 18% w/w to about 30% w/w of the composition, or from about 20% w/w to about 28% w/w of the composition. In some embodiments, the compositions comprise pyroglutamic acid in an amount less than about 40%, less than about 35%, less than about 30%, less than about 25%, less than about 20%, or less than about 15% w/w of the composition. In some embodiments, the compositions comprise pyroglutamic acid in an amount of at least about 10%, at least about 15%, at least about 20%, at least about 25%, at least about 30%, or at least about 35% w/w of the composition.

In embodiments, the compositions comprise NBPT in an amount from about 13% w/w to about 40% w/w of the composition, or from about 15% w/w to about 35% w/w of the composition, or from about 18% w/w to about 34% w/w of the composition, or from about 20% w/w to about 30% w/w of the composition. In some embodiments, the compositions comprise NBPT in an amount less than about 45%, less than about 40%, less than about 35%, less than about 30%, less than about 25%, less than about 20%, or less than about 15% w/w of the composition. In some embodiments, the compositions comprise NBPT in an amount of at least about 10%, at least about 15%, at least about 20%, at least about 25%, at least about 30%, at least about 35%, or at least about 40% w/w of the composition.

Useful ratios of pyroglutamic acid (PGA) to NBPT include 1 (PGA): 1 (NBPT); 1 (PGA): 2 (NBPT); 1 (PGA):3 (NBPT). In certain embodiments, the ratio of PGA to NBPT is about 1-3 (PGA):1 (NBPT). In certain embodiments, the ratio of PGA to NBPT is about 1.5-2.5 (PGA):1 (NBPT). In certain embodiments, the ratio of PGA to NBPT is about 1.5-1.8 (PGA):1 (NBPT). In certain embodiments, the ratio of PGA to NBPT is about 1.6 (PGA):1 (NBPT). In certain embodiments, the ratio of NBPT to PGA is about 1-15 (NBPT):1 (PGA). For example, useful ratios include 1 (NBPT):1 (PGA); or 2 (NBPT):1 (PGA); or 3 (NBPT):1 (PGA); or 4 (NBPT):1 (PGA); or 5 (NBPT):1 (PGA); or 6 (NBPT):1 (PGA); or 7 (NBPT):1 (PGA); or 8 (NBPT):1 (PGA); or 9 (NBPT):1 (PGA); or 10 (NBPT):1 (PGA); or 11 (NBPT):1 (PGA); or 12 (NBPT):1 (PGA); or 13 (NBPT):1 (PGA); or 14 (NBPT):1 (PGA); or 15 (NBPT):1 (PGA).

The compositions can contain further additives, such as solvents and dyes. For example, AGROTAIN ULTRA™ comprises about 26.7% NBPT and 73.3% inactive ingredients, such as N-methyl-2-pyrrolidone and 1,2-propanediol. In certain embodiments, a base, such as potassium hydroxide will be present. In certain embodiments, the N-P-K ratio is 0-0-6.

In embodiments, the composition further comprises phosphite. The amount of phosphite can be from about 0.1% to about 20% w/w, e.g., about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20%. In some embodiments the amount of phosphite is at least about 0.1%, at least about 0.5%, at least about 1%, at least about 5%, at least about 10%, or at least about 15%. In some embodiments, the amount of phosphite is less than about 20%, less than about 15%, less than about 10%, less than about 5%, less than about 1%, or less than about 0.5%.

In embodiments, the composition further comprises a chelating agent. The chelating agent is selected from the group consisting of an iron chelating agent, a manganese chelating agent, and a zinc chelating agent. The amount of chelating agent(s) can be from about 0.1% to about 20% w/w, e.g., about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20%. In some embodiments the amount of chelating agent is at least about 0.1%, at least about 0.5%, at least about 1%, at least about 5%, at least about 10%, or at least about 15%. In some embodiments, the amount of chelating agent is less than about 20%, less than about 15%, less than about 10%, less than about 5%, less than about 1%, or less than about 0.5%.

In embodiments, the composition further comprises dimethyl sulfone. The dimethyl sulfone can be present from about 1% to about 12% w/w, e.g., about 1%, about 2%, about 3%, about 4%, about 5%, about 6%, about 7%, about 8%, about 9%, about 10%, about 11%, or about 12%. In some embodiments the amount of dimethyl sulfone is at least about 1%, at least about 5%, or at least about 10%. In some embodiments, the amount of dimethyl sulfone is less than about 12%, less than about 10%, less than about 5%, or less than about 2%.

The compositions described herein can be formulated in any useful formulation.

III. Formulations

Formulations comprising pyroglutamic acid and NBPT can be in any useful form. Depending on their desired physical and/or chemical properties, formulations can be in the form of liquids, solids, aerosols, capsule suspensions, cold-fogging concentrates, warm-fogging concentrates, encapsulated granules, fine granules, flowable concentrates, ready-to-use solutions, dustable powders, emulsifiable concentrates, oil-in-water emulsions, water-in-oil emulsions, macrogranules, microgranules, oil-dispersible powders, oil-miscible flowable concentrates, oil-miscible liquids, gas (under pressure), gas-generating product, foams, pastes, suspension concentrates, soluble concentrates, suspensions, wettable powders, soluble powders, dusts and granules, water-soluble and water-dispersible granules or tablets, water-soluble and water-dispersible powders, wettable powders, microencapsulations in polymeric substances and in coating materials. For purposes of the present disclosure, "ready-to-use" refers to compositions that are not in a concentrate form but rather which may be applied without modification of the relative amounts of components within the product. In embodiments, compositions and formulations are provided in concentrates for end-use tank-mixing.

In embodiments, a formulation comprising pyroglutamic acid and NBPT is a type selected from the group consisting of emulsifiable concentrate, soluble concentrate, oil-in-water emulsion, microemulsion, oil based suspension concentrate, suspension concentrate, and dispersible concentrate. In embodiments, the formulation is an emulsifiable concentrate or a soluble concentrate.

The formulations include those which are ready-for-use and can be applied with a suitable apparatus to the plant, and also commercial concentrates which have to be diluted with water prior to use, e.g., a tank-mix. Customary applications are, for example, dilution in water and subsequent spraying of the resulting spray liquid, application after dilution in oil, or direct application without dilution.

Formulations can include solvents. Suitable organic solvents include all polar and non-polar organic solvents usually employed for formulation purposes. Preferably the solvents are selected from ketones, e.g., methyl-isobutyl-ketone and cyclohexanone, amides, e.g., dimethyl formamide, and alkanecarboxylic acid amides, e.g., N,N-dimethyl decaneamide and N,N-dimethyl octanamide, furthermore cyclic solvents, e.g., N-methyl-pyrrolidone, N-octyl-pyrrolidone, N-dodecylpyrrolidone, N-octyl-caprolactame, N-dodecyl-caprolactame and butyrolactone, furthermore strong polar solvents, e.g., dimethylsulfoxide, and aromatic hydrocarbons, e.g., xylol, SOLVESSO™, mineral oils, e.g., white spirit, petroleum, alkyl benzenes and spindle oil, also esters, e.g., propyleneglycol-monomethylether acetate, adipic acid dibutylester, acetic acid hexylester, acetic acid heptylester, citric acid tri-n-butylester and phthalic acid di-n-butylester, and also alcohols, e.g., benzyl alcohol and 1-methoxy-2-propanol. Useful liquid solvents are essentially: aromatics such as xylene, toluene or alkylnaphthalenes, chlorinated aromatics and chlorinated aliphatic hydrocarbons such as chlorobenzenes, chloroethylenes or dichloromethane, aliphatic hydrocarbons such as cyclohexane or paraffins, for example, mineral oil fractions, mineral and vegetable oils, alcohols such as butanol or glycol and their ethers and esters, ketones such as acetone, methyl ethyl ketone, methyl isobutyl ketone or cyclohexanone, strongly polar solvents such as dimethylformamide and dimethyl sulphoxide, and also water. The solvent can be present in an amount from about 1% to about 99% w/w, for example, about 5% to about 75%, about 15% to about 70%, about 25% to about 65%, about 35% to about 60%, about 40% to about 55%, or about 45% to about 50%. In some embodiments, the solvent is water.

Formulations can include carriers and fillers. A carrier is a natural or synthetic, organic or inorganic substance for admixing or combining with the compositions for better applicability, in particular for application to plants or plant parts. The carrier, which may be solid or liquid, is generally inert and should be suitable for use in agriculture. Useful solid or liquid carriers include, for example, ammonium salts and natural rock dusts, such as kaolins, clays, talc, chalk, quartz, attapulgite, montmorillonite or diatomaceous earth, and synthetic rock dusts, such as finely divided silica, alumina and natural or synthetic silicates, resins, waxes, solid fertilizers, water, alcohols, especially butanol, organic solvents, mineral and vegetable oils, and derivatives thereof. Mixtures of such carriers can likewise be used.

Suitable solid fillers and carriers include inorganic particles, e.g., carbonates, silicates, sulphates and oxides with an average particle size of between 0.005 and 20 μm, preferably of between 0.02 to 10 μm, for example, ammonium sulphate, ammonium phosphate, urea, calcium carbonate, calcium sulphate, magnesium sulphate, magnesium oxide, aluminum oxide, silicium dioxide, so-called fine-particle silica, silica gels, natural or synthetic silicates, and alumosilicates and plant products like cereal flour, wood powder/sawdust and cellulose powder.

Useful solid carriers include, for example, crushed and fractionated natural rocks such as calcite, marble, pumice, sepiolite, dolomite, and synthetic granules of inorganic and organic meals, and also granules of organic material such as sawdust, coconut shells, maize cobs and tobacco stalks.

Useful liquefied gaseous extenders or carriers are those liquids which are gaseous at standard temperature and under standard pressure, for example, aerosol propellants such as halohydrocarbons, and also butane, propane, nitrogen and carbon dioxide.

Formulations can include other additional components, for example, protective colloids, binders, extenders, adhesives, tackifiers, thickeners, thixotropic substances, penetrants, stabilizers, sequestrants, surfactants, complexing agents, etc. In general, the compositions can be combined with any solid or liquid additive commonly used for formulation purposes.

In the formulations, it is possible to use tackifiers such as carboxymethylcellulose, and natural and synthetic polymers in the form of powders, granules or lattices, such as gum arabic, polyvinyl alcohol and polyvinyl acetate, or else natural phospholipids, such as cephalins and lecithins, and synthetic phospholipids. Further additives may be mineral and vegetable oils. If the extender used is water, it is also possible to employ, for example, organic solvents as auxiliary solvents.

The formulations may additionally comprise surfactants. Useful surfactants are emulsifiers and/or foam formers, dispersants or wetting agents having ionic or nonionic properties, or mixtures of these surfactants. Examples of these are salts of polyacrylic acid, salts of lignosulphonic acid, salts of phenolsulphonic acid or naphthalenesulphonic acid, polycondensates of ethylene oxide with fatty alcohols or with fatty acids or with fatty amines, substituted phenols (preferably alkylphenols or arylphenols), salts of sulphosuccinic esters, taurine derivatives (preferably alkyl taurates), phosphoric esters of polyethoxylated alcohols or phenols, fatty esters of polyols, and derivatives of the compounds containing sulphates, sulphonates and phosphates, for example, alkylaryl polyglycol ethers, alkylsulphonates, alkylsulphates, arylsulphonates, protein hydrolysates, lignosulphite waste liquors and methylcellulose. The presence of a surfactant is necessary if one of the active ingredients and/or one of the inert carriers is insoluble in water and when application is effected in water. The proportion of surfactants is between about 5% and about 40% by weight of the composition. In some embodiments, the proportion of surfactants is between about 10% and about 30% or between about 15% and about 25% by weight of the composition. In some embodiments, the proportion of surfactant is less than about 40%, less than about 30%, less than about 25%, less than about 20%, less than about 10%, or less than about 5% by weight of the composition. In some embodiments, the proportion of surfactants is more than about 5%, more than about 10%, more than about 20%, more than about 25%, or more than about 30% by weight of the composition.

Suitable surfactants (adjuvants, emulsifiers, dispersants, protective colloids, wetting agent and adhesive) include all common ionic and non-ionic substances, for example, ethoxylated nonylphenols, polyalkylene glycolether of linear or branched alcohols, reaction products of alkyl phenols with ethylene oxide and/or propylene oxide, reaction products of fatty acid amines with ethylene oxide and/or propylene oxide, fatty acid esters, alkyl sulfonates, alkyl sulphates, alkyl ethersulphates, alkyl etherphosphates, arylsulphate, ethoxylated arylalkylphenols (e.g., tristyrylphenol-ethoxylates, ethoxylated and propoxylated arylalkylphenols like sulphated or phosphated arylalkylphenol-ethoxylates and -ethoxy- and -propoxylates). Further examples are natural and synthetic, water soluble polymers, e.g., lignosulphonates, gelatine, gum arabic, phospholipides, starch, hydrophobic modified starch and cellulose derivatives, in particular cellulose ester and cellulose ether, polyvinyl alcohol, polyvinyl acetate, polyvinyl pyrrolidone, polyacrylic acid, polymethacrylic acid and co-polymerisates of (meth)acrylic acid and (meth)acrylic acid esters, and co-polymerisates of methacrylic acid and methacrylic acid esters which are neutralized with alkalimetal hydroxide and also condensation products of optionally substituted naphthalene sulfonic acid salts with formaldehyde.

The formulations may comprise colorants and dyes. Dyes include inorganic pigments, for example, iron oxide, titanium oxide and Prussian blue, and organic dyes such as alizarin dyes, azo dyes and metal phthalocyanine dyes, and trace nutrients such as salts of iron, manganese, boron, copper, cobalt, molybdenum, and zinc.

Antifoams which may be present in the formulations include, e.g., silicone emulsions, long-chain alcohols, fatty acids and their salts as well as fluoroorganic substances and mixtures thereof.

Thickeners include polysaccharides, e.g., xanthan gum or veegum, silicates, e.g., attapulgite, bentonite and fine-particle silica.

The amounts of active ingredients in the compositions and formulations are generally between 0.05 and 99% by weight, between 0.01 and 98% by weight, between 0.1 and 95% by weight, between 0.5 and 90% by weight, between 10 and 70% by weight, between 20 and 60%, or between 25 and 50% by weight. In some embodiments, the amounts of active ingredients is preferably between 0.1 and 95% by weight, more preferably between 0.5 and 90% by weight, and most preferably between 10 and 70% by weight. Depending on the formulation and desired route of application, one of ordinary skill in the art can determine appropriate amounts of active ingredients and additives, and the amount of active ingredient(s) and additive(s) in the formulations may vary in a broad range. The concentration of the active ingredients in the application forms is generally between 0.000001 and 95% by weight, between 0.0001 and 20%, between 0.0001 and 10%, between 0.0001 and 2%, between 0.001 and 2%, between 0.01 and 1.5%, or between 0.1 and 1% by weight of active ingredients. Alternatively, a formulation can contain active ingredients at a concentration from 1 mole/liter to about 10,000 moles/liter, or from about 2 moles/liter to about 5,000 moles/liter, or from about 3 moles/liter to about 3,000 moles/liter, or from about 4 moles/liter to about 2,000 moles/liter, or from about 5 moles/liter to about 500 moles/liter, or from about 5 moles/liter to about 200 moles/liter, or from about 5 moles/liter to about 100 moles/liter, or from about 5 moles/liter to about 50 moles/liter, or from about 5 moles/liter to about 15 moles/liter, or from about 5 moles/liter to about 10 moles/liter.

The formulations mentioned can be prepared in a manner known, for example, by mixing the active ingredients with at least one customary extender, solvent or diluent, adjuvant, emulsifier, dispersant, and/or binder or fixative, wetting agent, water repellent, if appropriate, desiccants and UV stabilizers, and, if appropriate, dyes and pigments, antifoams, preservatives, such bronopol in an amount of about 0.04%, inorganic and organic thickeners, adhesives, gibberellins, further processing auxiliaries, and also water. Depending on the formulation type to be prepared, further processing steps are necessary, e.g., wet grinding, dry grinding, and granulation.

The formulations can include other known active ingredients, such as insecticides, attractants, sterilants, bactericides, acaricides, nematicides, growth regulators, herbicides, fertilizers, and the like.

IV. Methods

In embodiments, the methods include increasing the crude protein yield of a plant as compared to an untreated plant, the method comprising: applying a composition comprising pyroglutamic acid and NBPT to the plant, wherein, in embodiments, the pyroglutamic acid and NBPT are present in synergistic amounts.

In embodiments, the methods include improving the nitrogen use efficiency of a plant as compared to an untreated plant, the method comprising: applying a composition comprising pyroglutamic acid and NBPT to the plant, wherein, in embodiments, the pyroglutamic acid and NBPT are present in synergistic amounts.

In embodiments, the methods include increasing the % nitrogen of plant tissue compared to an untreated plant, the method comprising: applying a composition comprising pyroglutamic acid and NBPT to the plant, wherein, in embodiments, the pyroglutamic acid and NBPT are present in synergistic amounts.

In embodiments, the methods include increasing the % phosphorous of plant tissue compared to an untreated plant, the method comprising: applying a composition comprising pyroglutamic acid and NBPT to the plant, wherein, in embodiments, the pyroglutamic acid and NBPT are present in synergistic amounts.

In certain embodiments, PGA can be applied from about 75-500 gm ai/ha (where gm ai/ha is grams of active ingredient per hectare), or from about 100-400 gm ai/ha. In certain embodiments, PGA can be applied at about 125-300 gm ai/ha. In certain embodiments, PGA can be applied at about 75, 100, 125, 150, 175, 200, 225, 250, 275, 300, 325, 350, 375, 400, 425, 450, 475 or at about 500 gm ai/ha. Advantageously, the amount can be lower than an amount that would be used absent a synergistic effect. As used herein, unless otherwise noted, gram per hectare and synonomous terms refers to grams or active ingredient per hectare.

In certain embodiments, NBPT can be applied from about 300-2270 g/ha; or from about 300-1135 g/ha. Advantageously, the amount can be lower than an amount that would be used absent a synergistic effect. In certain embodiments, NBPT can be applied at about 300 g/ha.

In embodiments, the active agents can be applied at rates that include PGA at an amount of about 75 g to about 300 g per hectare, and NBPT at an amount from about 300 g to about 2270 g per hectare. In embodiments, the active agents can be applied at rates that include PGA at an amount of about 125 g to about 300 g per hectare, and NBPT at an amount from about 300 g to about 1135 g per hectare. In embodiments, the active agents can be applied at rates that include PGA at an amount of about 300 g per hectare, and NBPT at an amount of about 300 g per hectare. In embodiments, the active agents can be applied at rates that include PGA at an amount of about 250 g per hectare, and NBPT at an amount of about 300 g per hectare.

When the pyroglutamic acid is applied as TAKE OFF BOOSTER™, the amount applied can be a percentage of the label rate, or the full label rate. For example, the rate can be 25% of the label rate, 50% of the label rate, 75% of the label rate, 100% of the label rate, i.e., full label rate or 1×; or 125% of the label rate, or 150% of the label rate, or 175% of the label rate, or 200% of the label rate, i.e., 2×. When the NBPT is applied as AGROTAIN ULTRA™, the amount applied can be a percentage of the label rate, or the full label rate. For example, the rate can be 25% of the label rate, 50% of the label rate, 75% of the label rate, 100% of the label rate, i.e., full label rate or 1×; or 125% of the label rate, or 150% of the label rate, or 175% of the label rate, or 200% of the label rate, i.e., 2×.

The methods described herein involve treatment of the plants and plant parts with the compositions or formulations directly or by action on their surroundings, by any customary treatment methods, for example, by side-dressing, contacting the foliar region, dipping, spraying, atomizing, irrigating, evaporating, dusting, fogging, broadcasting, foaming, painting, spreading-on, watering (drenching), drip irrigating and, in the case of propagation material, slurry treatment, incrustation, coating with one or more coats, etc. It is also possible to deploy the compositions or formulations by the ultra-low volume method or to inject the compositions or formulations into the soil. In particular, the methods can be used on soil by side-dressing, placing, dropping, spreading, spraying, broadcasting, deep or sub-surface placement, localized placement, contact, band, hill, and row placement, knife-in, etc., and any other method. Also contemplated are treatment of above-ground parts of plants, of propagation stock, and of the soil. The soil may be in the area near or adjacent, i.e., vicinity, to a plant of interest, such as a crop plant. As used herein, the term "foliar region" refers primarily to the leaves of the plant.

Thus, in some embodiments, the currently disclosed compositions and/or formulations are applied to the soil after the plant has emerged. For example, in some embodiments, the currently disclosed compositions and/or formulations are applied to the soil after at least about 1%, 10%, 20%, 30%, 40%, 50%, 60%, 70%, 80%, 90%, or about at least 95% emergence of the plant. In some embodiments, the currently disclosed compositions and/or formulations are applied to the soil prior to the emergence of the plant. In some embodiments, the currently disclosed compositions and/or formulations are applied for 1-3 days, 5-7 days, or 6-10 days (or 1, 2, 3, 4, 5, 6, 7, 8, 9, 10 days) after planting.

In embodiments, the compositions, formulations and methods provide sustainable agriculture, comprising nutrient use efficiency, especially nitrogen (N)-use efficiency, phosphorus (P)-use efficiency, water use efficiency, improved transpiration, respiration and/or $CO_2$ assimilation rate, better nodulation, improved Ca-metabolism, etc.

The methods can advantageously improve plant health, for example, crop characteristics including, but not limited to nitrogen use efficiency, crude protein percentage yield, better emergence, increased crop yields, more favorable protein and/or content, more favorable amino acid and/or oil composition, more developed root system (improved root growth), tillering increase, increase in plant height, bigger leaf blade, less dead basal leaves, stronger tillers, greener leaf color, pigment content, photosynthetic activity, less fertilizers needed, less seeds needed, more productive tillers, earlier flowering, early grain maturity, less plant verse (lodging), increased shoot growth, enhanced plant vigor, increased plant stand or early germination; or a combination of at least two or more of the aforementioned effects or any other advantages familiar to a person skilled in the art. The improvements can be determined by an increase of one or more of the above characteristics as compared to control. In some embodiments, the control are plants and/or crops which are not treated with a composition comprising pyroglutamic acid and NBPT. The increase can be above about 5%, above about 10%, above about 15%, above about 20%, above about 25%, above about 30%, above about 35%, above about 40%, above about 45%, or above about 50%; or the improvement can be from about 5% to about 50%, or from about 5% to about 35%, or from about 5% to about 25%, or from about 5% to about 15%, or from about 7% to about 11%, or from about 8% to about 10%. In some embodiments, the increase can comprise at least an increase of about 1%, 5%, 10%, 15%, 20%, 25%, 30%, 35%, 40%, 45%, 50%, 55%, 60%, 65%, 70%, 75%, 80%, 85%, 90%, or at least 95% compared to control plants. In particular, the improvement can be the result of a synergistic effect.

In some embodiments, the improvements can be determined by an increase of one or more of the above characteristics as compared to plants and/or crops that were only treated with pyroglutamic acid or NBPT. The increase can be about 1 to about 20%, about 2% to about 15%, about 3% to about 12%, about 4% to about 10%, or about 5% to about 8% compared to plants and/or crops that were treated with either pyroglutamic acid or NBPT. In some embodiments, the increase can comprise at least an increase of about 1%, 2%, 3%, 4%, 5%, 6%, 7%, 8%, 9%, 10%, 11%, 12%, 13%, 14%, or 15% compared to plants and/or crops that were treated with either pyroglutamic acid or NBPT. In particular, the improvement can be the result of a synergistic effect In some embodiments, the disclosed methods improve a combination of at least two or more of the aforementioned effects or any other advantages familiar to a person skilled in the art, wherein not all of the one or more of the aforementioned effects are the result of a synergistic effect. For example, in some embodiments, the disclosed methods improves two of the above mentioned effects (e.g., crop yield and protein content), however only one of the effects (e.g., and increase in protein content) is due to a synergistic effect, whereas the other observed effect (e.g., increase in crop yield) is not.

The effects can be determined by assays known in the art. The effects can be at certain time points, such as days after emergence (DAE). In some embodiments, the effects are at DAE ranging from about 1 to 7 days, from about 3-7 days, from about 5-10 days, from about 8-15 days, from about 14 to about 21 days, or from about 21-28 days. In certain embodiments, the effects are at DAE 1, 2, 3, 4, 5, 6, 7, 8, 9, 10, 11, 12, 13, 14, 15, 16, 17, 18, 19, 20 or 21, or longer.

Methods include increasing the yield of a crop plant. Crude protein percentage yield refers to the protein content in grain and is a measure of nitrogen uptake during the growing season. A higher crude protein in the grain relative to control is evidence of increased nitrogen uptake during the growing season. Increased yields can also include total biomass per hectare, yield per hectare, kernel/fruit weight, seed size and/or hectoliter weight as well as increased product quality, comprising: improved processability relating to size distribution (kernel, fruit, etc.), homogenous riping, grain moisture, better milling, better vinification, increased juice yield, harvestability, digestibility, sedimentation value, falling number, pod stability, storage stability, improved fiber length/strength/uniformity, increase of milk and/or meat quality of silage fed animals; further comprising improved marketability relating to improved fruit/grain quality, size distribution (kernel, fruit, etc.), increased storage/shelf-life, firmness/softness, taste (aroma, texture, etc.), grade (size, shape, number of berries, etc.), number of berries/fruits per bunch, crispness, freshness, coverage with wax, frequency of physiological disorders, color, etc.; further comprising increased desired ingredients such as protein content, fatty acids, oil content, oil quality, amino acid composition, sugar content, acid content (pH), sugar/acid ratio (Brix), polyphenols, starch content, nutritional quality, gluten content/index, energy content, taste, etc.; and further comprising decreased undesired ingredients such as less mycotoxines, less aflatoxines, geosmin level, phenolic aromas, lacchase, polyphenol oxidases and peroxidases, nitrate content, etc.

In embodiments, the subject matter disclosed herein is directed to a method of increasing the crude protein percentage yield of a crop compared to an untreated crop comprising: applying to a plant or soil in the vicinity of the plant a composition comprising pyroglutamic acid and NBPT, wherein the increase in crude protein yield is from about 3% to about 25%; or from about 3% to about 20%; or from about 4% to about 15%, or from about 4% to about 13%; or from about 7% to about 13%; or about 4%, 5%, 6%, 7%, 8%, 9%, 10%, 11%, 12% or 13%. In some embodiments, the pyroglutamic acid and NBPT are present in synergistic amounts.

In embodiments, the methods include improving the nitrogen use efficiency of a plant as compared to an untreated plant, the methods comprising: applying a composition comprising pyroglutamic acid and NBPT to the plant, wherein, in embodiments, the pyroglutamic acid and NBPT are present in synergistic amounts. In embodiments, the nitrogen use efficiency is improved by about 1% to about 20%, from about 2% to about 8%, from about 2% to about 5%, from about 5% to about 15%, from about 8 to about 12%; or about 2%, about 3%, about 4%, about 5%, about 6%, about 7% about 8%, about 9%, about 10%, about 11%, about 12%, about 13%, about 14%, or about 15%.

In embodiments, the methods include increasing the % nitrogen of plant tissue compared to an untreated plant, the method comprising: applying a composition comprising pyroglutamic acid and NBPT to the plant, wherein, in embodiments, the pyroglutamic acid and NBPT are present in synergistic amounts. In embodiments, the % nitrogen is increased by about 1% to about 20%, from about 2% to about 8%, from about 2% to about 5%, from about 5% to about 15%, from about 8% to about 12%; or about 2%, about 3%, about 4%, about 5%, about 6%, about 7%, about 8%, about 9%, about 10%, about 11%, about 12%, about 13%, about 14%, or about 15%.

In embodiments, the methods include increasing the % phosphorous of plant tissue compared to an untreated plant, the method comprising: applying a composition comprising pyroglutamic acid and NBPT to the plant, wherein, in embodiments, the pyroglutamic acid and NBPT are present in synergistic amounts. In embodiments, the % phosphorous is increased by about 4% to about 35%, by about 20% to about 35%, by about 25% to about 35%, by about 4% to about 20%, by about 5% to about 15%, or by about 8% to about 13%; or about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, or about 35%.

In some embodiments, the disclosed methods include increasing the % nitrogen and % phosphorous of plant tissue compared to an untreated plant. In some embodiments, the pyroglutamic acid and NBPT are present in synergistic amounts to increase such % nitrogen and % phosphorous of plant tissue.

The methods can also increase or improve other beneficial plant effects, such as plant strengthening, stress tolerance, plant vigor, delayed senescence, more developed root system, water use efficiency, color, greening, and photosynthetic efficiency.

In embodiments, the methods can provide a plant strengthening effect. Accordingly, they can be used for mobilizing the defences of the plant against attack by undesirable microorganisms. Plant-strengthening (resistance-inducing) substances are to be understood as meaning, in the present context, those substances which are capable of stimulating the defense system of plants in such a way that the treated plants, when subsequently inoculated with undesirable microorganisms, develop a high degree of resistance to these microorganisms.

In embodiments, the methods can increase abiotic stress tolerance, comprising temperature tolerance, drought tolerance and recovery after drought stress, water use efficiency (correlating to reduced water consumption), flood tolerance, ozone stress and UV tolerance, and tolerance towards chemicals like heavy metals, salts, pesticides, etc., and biotic stress tolerance, comprising increased fungal resistance and increased resistance against nematodes, viruses, and bacteria. In context with the present disclosure, biotic stress tolerance preferably comprises increased fungal resistance.

In embodiments, the methods can provide increased plant vigor, including plant quality, reduced stand failure, improved appearance, increased recovery, improved greening effect and improved photosynthetic efficiency. Beneficial effects can also include earlier germination, better emergence, more developed root system and/or improved root growth, increased ability of tillering, more productive tillers, earlier flowering, increased plant height and/or biomass, shorting of stems, improvements in shoot growth, number of kernels/ear, number of ears/m$^2$, number of stolons and/or number of flowers, enhanced harvest index, bigger leaves, less dead basal leaves, improved phyllotaxy, earlier maturation/earlier fruit finish, homogenous riping, increased duration of grain filling, better fruit finish, bigger fruit/vegetable size, sprouting resistance and reduced lodging.

In embodiments, improvements can be in the form of delayed senescence, comprising improvement of plant physiology, a longer duration of green leaf coloration of the plant and thus comprising colour (greening), water content, dryness, etc. This can have the benefit of greater flexibility in the harvesting time.

In embodiments, improvements can be in the form of a more developed root system. The term "more developed root system" or "improved root growth" refers to a longer root system, deeper root growth, faster root growth, higher root dry/fresh weight, higher root volume, larger root surface area, bigger root diameter, higher root stability, more root branching, higher number of root hairs, and/or more root tips and can be measured by analyzing the root architecture with suitable methodologies and analysis.

In embodiments, improvements can be in the form of water use. The term "crop water use efficiency" refers technically to the mass of agriculture produce per unit of water consumed and economically to the value of product(s) produced per unit of water volume consumed and can, for example, be measured in terms of yield per hectare (ha), biomass of the plants, thousand-kernel mass, and the number of ears per m$^2$.

Improvement in greening/improved color and improved photosynthetic efficiency as well as the delay of senescence can be measured with well-known techniques such as a Handy PEA system (Hansatech), net photosynthetic rate (Pn), measurement of the chlorophyll content, e.g., by the pigment extraction method of Ziegler and Ehle, measurement of the photochemical efficiency (Fv/Fm ratio), determination of shoot growth and final root and/or canopy biomass, and determination of tiller density as well as of root mortality.

The methods of treatment provide contacting, i.e., use or application of compounds in a simultaneous, separate or sequential manner. If the single active ingredients are applied in a sequential manner, i.e., at different times, they are applied one after the other within a reasonably short period, such as a few hours or days.

In embodiments, the plant is a crop as described elsewhere herein. In embodiments, the crop is selected from the group consisting of cereals (wheat, barley, oats, triticale, rye, and rice), maize, soya beans, potatoes, vegetables, peanuts, cotton, oilseed rape and fruit plants. In embodiments, the crop is maize.

In embodiments, the methods comprise applying pyroglutamic acid in the form of L-pyroglutamic acid. In embodiments, the methods comprise applying pyroglutamic acid as a mixture of L- and D-pyroglutamic acid in a ratio of L to D of from about 80:20 to about 97:3.

The methods described herein can be used at any growth stage during development of the plant, including vegetative, emergence, pollination and reproductive stages, depending on the plant and the desired effect. However, in embodiments, certain stages are targeted for the contacting of the compositions and formulations to promote specific effects. Stages are recognized in growing degree units (GDUs) as is known by those of ordinary skill. For example, in maize, the methods can be advantageously used on crops that are in a vegetative stage. In general, the period of growth between germination and flowering is known as the vegetative phase of plant development. In maize, vegetative stages include VE, V1, V2, V4, V6, V10, V12, V14 and VT. In certain aspects, the crop is in a stage prior to tasseling. In certain aspects, the crop is at V4, V6 or V10 stage. In certain aspects, the crop is at V6 stage.

V. Articles of Manufacture

In another aspect, described herein are articles of manufacture, for example, a "kit," containing the pyroglutamic acid and NBPT. The kit comprises a container comprising pyroglutamic acid. The kit can further comprise a separate container comprising NBPT. The kit advantageously can contain pre-measured amounts, for example, in amounts set forth elsewhere herein, of each of the components such that, for example, a tank-mix can be easily prepared by the end-user by combining the contents of the kit in a solvent, such as water. The kit may further comprise a label or package insert, on or associated with the container. The term "package insert" is used to refer to instructions customarily included in agricultural packages, and can contain usage, application rates, and warnings concerning the use of the components. Suitable containers for inclusion in the kit include, for example, bottles, vials, syringes, blister pack, etc. The container may be formed from a variety of materials such as glass or plastic.

Particular embodiments of the subject matter described herein include:

1. A composition comprising pyroglutamic acid and N-(n-butyl)-thiophosphoric triamide (NBPT), wherein the pyroglutamic acid and NBPT are present in synergistically effective amounts.

2. The composition of embodiment 1, wherein the pyroglutamic acid is present in an amount from about 12% w/w to about 36% w/w of the composition.

3. The composition of any above embodiment, wherein the pyroglutamic acid is present in an amount from about 15% w/w to about 33% w/w of the composition.

4. The composition of any above embodiment, wherein the pyroglutamic acid is present in an amount from about 20% w/w to about 28% w/w of the composition.

5. The composition of any above embodiment, wherein the NBPT is present in an amount from about 13% w/w to about 40% w/w of the composition.

6. The composition of any above embodiment, wherein the NBPT is present in an amount from about 15% w/w to about 35% w/w of the composition.

7. The composition of any above embodiment, wherein the NBPT is present in an amount from about 20% w/w to about 30% w/w of the composition.

8. The composition of any above embodiment, wherein the pyroglutamic acid is L-pyroglutamic acid.

9. The composition of any above embodiment, wherein the pyroglutamic acid is a mixture of L- and D-pyroglutamic acid in a ratio of L to D of from about 80:20 to about 97:3.

10. The composition of any above embodiment, further comprising about 6% soluble potash and a preservative, such as bronopol.

11. The composition of any above embodiment, further comprising N-methyl-2-pyrrolidone, a base, such as potassium hydroxide, and/or 1,2-propanediol.

12. A method of increasing grain crude protein (%) of a plant comprising applying pyroglutamic acid and NBPT, such as the composition of any above embodiment, to the plant or area adjacent to the plant.

13. The method of embodiment 12, wherein the pyroglutamic acid and the NBPT are applied sequentially.

14. The method of embodiment 12 or 13, wherein the pyroglutamic acid and the NBPT are applied simultaneously.

15. The method of embodiment 12 or 14, wherein the pyroglutamic acid and the NBPT are applied as a single composition.

16. The method of embodiment 12, 13, 14 or 15, wherein the pyroglutamic acid and the NBPT are present in synergistically effective amounts.

17. The method of embodiment 12, 13, 14, 15 or 16, wherein the applying comprises contacting PGA at a rate of about 75 g/ha to about 300 g/ha, and NBPT at about 300 g/ha to about 2270 g/ha.

18. The method of embodiment 12, 13, 14, 15, 16 or 17, wherein the applying comprises contacting at a rate of about contacting PGA at a rate of about 125 g/ha to about 300 g/ha, and NBPT at about 300 g/ha to about 1135 g/ha.

19. The method of embodiment 12, 13, 14, 15, 16, 17 or 18, wherein the applying comprises contacting at a rate of about contacting PGA at a rate of about 300 g/ha, and NBPT at about 300 g/ha.

20. The method of embodiment 12, 13, 14, 15, 16, 17, 18 or 19, wherein the applying comprises side-dress.

21. The method of embodiment 12, 13, 14, 15, 16, 17, 18, 19 or 20, wherein the plant is in a vegetative stage.

22. The method of embodiment 12, 13, 14, 15, 16, 17, 18, 19, 20 or 21, wherein the plant is in a stage prior to tasseling.

23. The method of embodiment 12, 13, 14, 15, 16, 17, 18, 19, 20, 21 or 22, wherein said plant is selected from the group consisting of cereals, wheat, barley, oats, triticale, rye, rice, maize, soya beans, potatoes, vegetables, peanuts, cotton, oilseed rape and fruit plants.

24. The method of embodiment 12, 13, 14, 15, 16, 17, 18, 19, 20, 21, 22 or 23, wherein the plant is maize.

25. The method of embodiment 12, 13, 14, 15, 16, 17, 18, 19, 20, 21, 22, 23 or 24, wherein crude protein yield is increased from about 3% to about 25% as compared to an untreated plant.

26. The method of embodiment 12, 13, 14, 15, 16, 17, 18, 19, 20, 21, 22, 23, 24 or 25, wherein crude protein yield is increased from about 4% to about 15% as compared to an untreated plant.

27. The method of embodiment 12, 13, 14, 15, 16, 17, 18, 19, 20, 21, 22, 23, 24, 25 or 26, wherein crude protein yield is increased about 7% as compared to an untreated plant.

28. The method of embodiment 12, 13, 14, 15, 16, 17, 18, 19, 20, 21, 22, 23, 24, 25, 26 or 27, wherein the composition comprises a base, such as potassium hydroxide, about 6% soluble potash and a preservative, such as bronopol.

29. The method of embodiment 12, 13, 14, 15, 16, 17, 18, 19, 20, 21, 22, 23, 24, 25, 26, 27 or 28, wherein the pyroglutamic acid is L-pyroglutamic acid.

30. The method of embodiment 12, 13, 14, 15, 16, 17, 18, 19, 20, 21, 22, 23, 24, 25, 26, 27, 28 or 29, wherein the pyroglutamic acid is a mixture of L- and D-pyroglutamic acid in a ratio of L to D of from about 80:20 to about 97:3.

31. The method of embodiment 12, 13, 14, 15, 16, 17, 18, 19, 20, 21, 22, 23, 24, 25, 26, 27, 28, 29 or 30, wherein the pyroglutamic acid is present in an amount from about 12% w/w to about 36% w/w, for example about 24%, and the NBPT is present in an amount from about 15% w/w to about 35% w/w, for example, about 27%.

32. A method of increasing percent nitrogen of plant tissue compared to an untreated plant, the method comprising applying a composition comprising pyroglutamic acid and NBPT, such as the composition of any above embodiment, to the plant or an area adjacent to the plant.

33. The method of embodiment 32, wherein said pyroglutamic acid and said NBPT are present in synergistic amounts.

34. The method of embodiment 32 or 33, wherein said percent nitrogen is increased from about 2% to about 8%.

35. The method of embodiment 32, 33 or 34, wherein said percent nitrogen is increased about 5%.

36. A formulation comprising pyroglutamic acid, NBPT and an agriculturally acceptable excipient.

37. The formulation of embodiment 36, wherein the formulation is a type selected from the group consisting of emulsifiable concentrate, soluble concentrate, oil-in-water emulsion, microemulsion, oil based suspension concentrate, suspension concentrate, and dispersible concentrate.

38. A method of preparing the composition of any above embodiment comprising: contacting the pyroglutamic acid with the NBPT in a vessel and allowing the pyroglutamic acid and the NBPT to mix in the vessel, wherein the composition is prepared.

39. The method of embodiment 38, wherein said contacting comprises an agriculturally acceptable excipient.

The following examples are offered by way of illustration and not by way of limitation. Certain data are amenable for use in a Colby Analysis to show synergism. The Colby equation:

$$\text{Expected value } (E) = (X*Y)/100,$$

where X and Y are the effects of the active agents applied alone (expressed as % of control). The actual value determined for the effect is compared to the expected value. If greater=synergism; if less than =antagonism; if equal=additive.

EXAMPLES

Example 1: Preparation of Composition

An exemplary composition was prepared as follows: A solution containing 24% PGA w/w and a separate solution containing 26.7% NBPT w/w were mixed together with UAN prior to application to plants.

Example 2: Proposed Field Study—PGA+NBPT Corn Yield (kg/ha)

Study Objective
Determine efficiency gained in application of VLS 8300-02 (AGROTAIN ULTRA™) and VLS 3000-01 (TAKE OFF BOOSTER™) with side-dress nitrogen on corn.
Seed Selection
A commonly used hybrid of the appropriate maturity with the highest yield potential for the site, and appropriate disease and pest traits for the site selected. The seed should be treated with a fungicide/insecticide seed treatment that will minimize seedling disease and insect pest pressure.
　Hybrid used—DSR 9303RA
　Base Seed treatment of Maxim Quatro/Poncho 500 on the seed before any additional treatment applied
Agronomic Practices
Employ commonly accepted production practices: tillage, fertility, planting, weed, insect and disease control for the site selected. If any unusual conditions develop during the growing season such as unusual pest or disease infestations, treat appropriately to minimize impact on the crop and note for the final report.
Provide the following information:
　Tillage (conventional, minimum or no-till)—Fall chisel plow and spring field cultivate to incorporate fertilizer and level field for planting
　Planting population=35000 seeds/A
　Planting date—(Day 0)
　Harvest date—

TABLE 1

| Herbicide applications and rates | | | |
|---|---|---|---|
| Material | Rate | Method | Notes |
| Harness Xtra | 2.0 qts | preemergence | 20 gpa with Plot sprayer at 40 psi, Calm, sunny, moist soil, 72° F. (22° C.) |
| Callisto | 3.0 oz | postemergence | 20 gpa with Plot sprayer at 40 psi, Calm, sunny, moist soil, 79° F. (22° C.) |
| Roundup WeatherMax | 16 oz | postemergence | 20 gpa with Plot sprayer at 40 psi, Calm, sunny, moist soil, 79° F. (22° C.) |

Experimental Design
Plot size of 10'×50' long (4 rows) arranged in a randomized complete block (RCB) design with 4 replications.
Treatments
　Read instructions for each treatment completely and carefully before mixing or applying to the seed, as measurements and units may vary.
　Shake all liquid components well, before mixing and applying.
　All treatments should receive the same starter fertilizer package and the same early season fertilizer.
　Total fertilizer applied to treatments should be 80% of recommended N for yield goal.
　40-50 gallons of UAN is negotiable, ensure N is limiting.
　Mix VLS 3000-01 in with UAN at 6 oz. per acre equivalent; mix vigorously.
　Application of side-dress is preferred to be as close to the stalks as possible at V-6 to V-8.
　Treatment 1: Untreated Control
　　No UAN at side-dress
　Treatment 2: Control
　　Applied side-dress at a rate of 50 gal per acre
　Treatment 3: UAN+VLS 3000-01
　　Applied side-dress at a rate of 50 gal per acre
　　VLS 3000-01 is added to UAN at a rate of 6 oz/acre
　　125 g ai/ha
　Treatment 4: UAN+VLS 8300-02
　　Applied side-dress at a rate of 50 gal per acre
　　VLS 8300-02 is added to UAN at a rate of 1.5 qt/182 gal
　Treatment 5: UAN+VLS 3000-01+VLS 8300-02
　　Applied side-dress at a rate of 50 gal per acre
　　VLS 3000-01 is added to UAN at a rate of 6 oz/acre
　　125 g ai/ha
　　VLS 8300-02 is added to UAN at a rate of 1.5 qt/182 gal

TABLE 2

| | Treatments |
|---|---|
| Treatment 1 | Maxim Quatro/Poncho 500 pre treated seed Control Side-dress 50 gal/a UAN only |
| Treatment 2 | Maxim Quatro/Poncho 500 pre treated seed Side-dress 50 gal/a UAN + VLS 3000-01 VLS 3000-01 added to UAN @ 6 oz/a |
| Treatment 3 | Maxim Quatro/Poncho 500 pre treated seed UAN + VLS 8300-02 Side-dress 50 gal/a UAN + VLS 4021 @ 1.5 qt/182 gal |
| Treatment 4 | Maxim Quatro/Poncho 500 pre treated seed Side-dress 50 gal/a UAN + VLS 3000-01 + VLS 8300-02 VLS 3000-01 added to UAN @ 6 oz/a VLS 8300-02 added to UAN @ 1.5 qt/182 gal |
| Treatment 5 | Maxim Quatro/Poncho 500 pre treated seed Untreated Check No UAN at Side-dress |

Data Collection
　Yield
　Yield—adjusted to 15% moisture
　Test Weight
　% moisture
　Grain sample Example 3: Greenhouse Study—PGA+NBPT Corn Yield (kg/ha)

Study Objective
Determine if there is a synergistic benefit of applying VLS 3000-01 and VLS 8300-02 together on corn seedlings (PGA+NBPT).
Site Selection
Greenhouse trial
Seed Selection
　Hybrid used for trial: Pfister 2565 RASS
Aronomic Practices
　Seed was planted 2/pot and thinned to 1/pot after emergence
　Plants were watered as needed
　Field soil was used
　Test plants received natural light for the duration of the trial
　Planting date—Day 0
　Treatment timing at 7 DAE (days after emergence)
　Treatment timing at 14 DAE
　Experiment completed, and tissue collected 28 DAE
Experimental Design
　Reps: 5 reps/treatment
　Trial design: randomized complete block (RCB) design Treatments applied 7 DAE or 14 DAE Treatments When preparing treatments, UAN added with agitation followed by VLS 3000-01, and then VLS 8300-02. Agitated to prevent settling.

Treatments 1-9 applied 7 DAE:

Treatment 1: UAN 28 (Control)
  UAN 28 (28% N) volume applied=0.34 mL/pot
Treatment 2: UAN 28+VLS 8300-02 (AGROTAIN ULTRA™)
  UAN 28 (28% N) volume applied=0.34 mL/pot
  VLS 8300-02 volume applied=0.00034 mL/pot
  ½ label rate (0.75 quarts/ton on UAN)
Treatment 3: UAN 28+VLS 8300-02 (AGROTAIN ULTRA™)
  UAN 28 (28% N) volume applied=0.34 mL/pot
  VLS 8300-02 volume applied=0.00068 mL/pot
  label rate (1.5 quarts/ton on UAN)
Treatment 4: UAN 28+VLS 3000-01 (TAKE OFF BOOSTER™)
  UAN 28 (28% N) volume applied=0.34 mL/pot
  VLS 3000-01 volume applied=0.001 mL/pot
  125 g ai/ha
Treatment 5: UAN 28+VLS 8300-02 (AGROTAIN ULTRA™)+VLS 3000-01 (TAKE OFF BOOSTER™)
  UAN 28 (28% N) volume applied=0.34 mL/pot
  VLS 8300-02 volume applied=0.00034 mL/pot
  ½ label rate (0.75 quarts/ton on UAN)
  VLS 3000-01 volume applied=0.001 mL/pot
  125 g ai/ha
Treatment 6: UAN 28+VLS 8300-02 (AGROTAIN ULTRA™)+VLS 3000-01 (TAKE OFF BOOSTER™)
  UAN 28 (28% N) volume applied=0.34 mL/pot
  VLS 8300-02 volume applied=0.00068 mL/pot
  label rate (1.5 quarts/ton on UAN)
  VLS 3000-01 volume applied=0.001 mL/pot
  125 g ai/ha
Treatment 7: UAN 28+VLS 3000-01 (TAKE OFF BOOSTER™)
  UAN 28 (28% N) volume applied=0.34 mL/pot
  VLS 3000-01 volume applied=0.002 mL/pot
  250 g ai/ha
Treatment 8: UAN 28+VLS 8300-02 (AGROTAIN ULTRA™)+VLS 3000-01 (TAKE OFF BOOSTER™)
  UAN 28 (28% N) volume applied=0.34 mL/pot
  VLS 8300-02 volume applied=0.00034 mL/pot
  ½ label rate (0.75 quarts/ton on UAN)
  VLS 3000-01 volume applied=0.002 mL/pot
  250 g ai/ha
Treatment 9: UAN 28+VLS 8300-02 (AGROTAIN ULTRA™)+VLS 3000-01 (TAKE OFF BOOSTER™)
  UAN 28 (28% N) volume applied=0.34 mL/pot
  VLS 8300-02 volume applied=0.00068 mL/pot
  label rate (1.5 quarts/ton on UAN)
  VLS 3000-01 volume applied=0.002 mL/pot
  250 g ai/ha Treatments 10-18 applied 14 DAE:

Treatment 10: UAN 28 (Control)
  UAN 28 (28% N) volume applied=0.34 mL/pot
Treatment 11: UAN 28+VLS 8300-02 (AGROTAIN ULTRA™)
  UAN 28 (28% N) volume applied=0.34 mL/pot
  VLS 8300-02 volume applied=0.00034 mL/pot
  ½ label rate (0.75 quarts/ton on UAN)
Treatment 12: UAN 28+VLS 8300-02 (AGROTAIN ULTRA™)
  UAN 28 (28% N) volume applied=0.34 mL/pot
  VLS 8300-02 volume applied=0.00068 mL/pot
  label rate (1.5 quarts/ton on UAN)
Treatment 13: UAN 28+VLS 3000-01 (TAKE OFF BOOSTER™)
  UAN 28 (28% N) volume applied=0.34 mL/pot
  VLS 3000-01 volume applied=0.001 mL/pot
  125 g ai/ha
Treatment 14: UAN 28+VLS 8300-02 (AGROTAIN ULTRA™)+VLS 3000-01 (TAKE OFF BOOSTER™)
  UAN 28 (28% N) volume applied=0.34 mL/pot
  VLS 8300-02 volume applied=0.00034 mL/pot
  ½ label rate (0.75 quarts/ton on UAN)
  VLS 3000-01 volume applied=0.001 mL/pot
  125 g ai/ha
Treatment 15: UAN 28+VLS 8300-02 (AGROTAIN ULTRA™)+VLS 3000-01 (TAKE OFF BOOSTER™)
  UAN 28 (28% N) volume applied=0.34 mL/pot
  VLS 8300-02 volume applied=0.00068 mL/pot
  label rate (1.5 quarts/ton on UAN)
  VLS 3000-01 volume applied=0.001 mL/pot
  125 g ai/ha
Treatment 16: UAN 28+VLS 3000-01 (TAKE OFF BOOSTER™)
  UAN 28 (28% N) volume applied=0.34 mL/pot
  VLS 3000-01 volume applied=0.002 mL/pot
  250 g ai/ha
Treatment 17: UAN 28+VLS 8300-02 (AGROTAIN ULTRA™)+VLS 3000-01 (TAKE OFF BOOSTER™)
  UAN 28 (28% N) volume applied=0.34 mL/pot
  VLS 8300-02 volume applied=0.00034 mL/pot
  ½ label rate (0.75 quarts/ton on UAN)
  VLS 3000-01 volume applied=0.002 mL/pot
  250 g ai/ha
Treatment 18: UAN 28+VLS 8300-02 (AGROTAIN ULTRA™)+VLS 3000-01 (TAKE OFF BOOSTER™)
  UAN 28 (28% N) volume applied=0.34 mL/pot
  VLS 8300-02 volume applied=0.00068 mL/pot
  label rate (1.5 quarts/ton on UAN)
  VLS 3000-01 volume applied=0.002 mL/pot
  250 g ai/ha
Treatment 19: Untreated Check:
  Treatment 19: Untreated Check
Treatment List (applied 7 DAE or 14 DAE)

TABLE 7

| | Replications/timing |
|---|---|
| 1 | UAN 28 alone |
| 2 | UAN 28 + Agrotain Ultra ½ label rate |
| 3 | UAN 28 + Agrotain Ultra label rate |
| 4 | UAN 28 + Take-Off 125 g ai/ha |
| 5 | UAN 28 + Agrotain Ultra ½ label rate + Take Off 125 g ai/ha |
| 6 | UAN 28 + Agrotain Ultra label rate + Take Off 125 g ai/ha |
| 7 | UAN 28 + Take-Off 250 g ai/ha |
| 8 | UAN 28 + Agrotain Ultra ½ label rate + Take-Off 250 g ai/ha |
| 9 | UAN 28 + Agrotain Ultra label rate + Take-Off 250 g ai/ha |
| 10 | UNFERTILIZED Check |

Data Collected

Chlorophyll content at 14 DAE, 21 DAE and 28 DAE measured by SPAD

Plant height at 14 DAE, 21 DAE and 28 DAE

Top fresh weight 28 DAE

% Nitrogen (total nitrogen determined by combustion method), P, S, K, Mg, Ca and Na and PPM B, Zn, Mn, Fe Cu, and Al in plant tissue at 28 DAE. Analysis conducted by A&L Great Lake Laboratories.

Data Analysis

Chlorophyll content, plant height, and fresh weight analyzed using Tukey's HSD test. Samples for % Nitrogen, P, S, K, Mg, Ca and Na and PPM B, Zn, Mn, Fe Cu, and Al were pooled leaving one sample/treatment. Colby Analysis for Synergistic Effect used for assessment for synergy. If observed value is greater than expected value, then synergy is present. Values converted to % of control for synergy calculations.

Results

Chlorophyll, Fresh Weight, and Plant Height

Treatment timing 7 DAE—No significant ($p \leq 0.20$) differences between control and treatments for chlorophyll, fresh weight, or plant heights. No synergy detected.

Treatment timing 14 DAE—No significant ($p \leq 0.20$) differences between control and treatments for chlorophyll, fresh weight, or plant heights. No synergy detected. % S, K, Mg, Ca and Na and PPM B, Zn, Mn, Fe Cu, and Al Treatment timing 7 DAE—Synergy was not detected at any of the tested rates for S, K, Mg, Ca, Na, B, Zn, Mn, Fe Cu, or Al.

Treatment timing 14 DAE—Synergy was not detected at any of the tested rates for S, K, Mg, Ca, Na, B, Zn, Mn, Fe Cu, or Al.

% N and % P

Treatment timing 7 DAE—Synergy was detected at the high rate (UAN 28+VLS 8300-02 (AGROTAIN ULTRA™-label rate)+VLS 3000-01 (TAKE OFF BOOSTER™-250 g ai/ha)) for % N and % P (Tables 8 and 9).

Treatment timing 14 DAE—Synergy was not detected at any of the tested rates for % N or P.

TABLE 8

% N in plant tissue collected 28 DAE. Treatments were applied 7 DAE. Colby analysis detected synergy in % N of control with UAN 28 + VLS 8300-02 (AGROTAIN ULTRA ™ -label rate) + VLS 3000-01 (TAKE OFF BOOSTER ™ -250 g ai/ha)*.

|  | % N | % of Control |
|---|---|---|
| Trt 1: Control (UAN 28) | 3.7 | — |
| Trt 3: UAN 28 + VLS 8300-02 (AGROTAIN ULTRA ™ - label rate) | 3.8 | 102.7 |
| Trt 16: UAN 28 + VLS 3000-01 (TAKE OFF BOOSTER ™ -250 g ai/ha) | 3.7 | 100.0 |
| Trt 9: UAN 28 + VLS 8300-02 (AGROTAIN ULTRA ™ - label rate) + VLS 3000-01 (TAKE OFF BOOSTER ™ - 250 g ai/ha) | 3.9 | 105.4 |
| Trt 19: Untreated Check | 3.5 | 94.6 |

*Synergy detected with UAN 28 + VLS 8300-02 (AGROTAIN ULTRA ™ -label rate) + VLS 3000-01 where observed % N of 105.4 was greater than expected value of 102.7 ((102.7*100.0)/100).

TABLE 9

% P in plant tissue collected 28 DAE. Treatments were applied 7 DAE. Colby analysis detected synergy in % P of control with UAN 28 + VLS 8300-02 (AGROTAIN ULTRA ™ -label rate) + VLS 3000-01 (TAKE OFF BOOSTER ™ -250 g ai/ha)*.

|  | % P | % of Control |
|---|---|---|
| Trt 1: Control (UAN 28) | 0.31 | — |
| Trt 3: UAN 28 + VLS 8300-02 (AGROTAIN ULTRA ™ -label rate) | 0.31 | 100.0 |
| Trt 16: UAN 28 + VLS 3000-01 (TAKE OFF BOOSTER ™ -250 g ai/ha) | 0.33 | 106.5 |
| Trt 9: UAN 28 + VLS 8300-02 (AGROTAIN ULTRA ™ -label rate) + VLS 3000-01 (TAKE OFF BOOSTER ™ - 250 g ai/ha) | 0.35 | 112.9 |
| Trt 19: Untreated Check | 0.25 | 80.6 |

*Synergy detected with UAN 28 + VLS 8300-02 (AGROTAIN ULTRA ™ -label rate) + VLS 3000-01 where observed % N of 112.9 was greater than expected value of 106.5 ((106.5*100.0)/100).

Colby Analysis for synergy:

Expected value is calculated by converting values to percent of the control and multiplying the values for single treatment and dividing by 100. This is then compared to the combination treatment.

Colby Analysis for synergy:

If Observed (O)>Expected (E) synergism

If O=E, additive

If O<E, antagonism

Example from Table 3: UAN 28+VLS 8300-02% N of control=102.7

UAN 28+VLS 3000-01% N of control=100.0

Expected value=(102.7*100.0)/100=102.7

Observed value=105.4

O (105.4)>E (102.7) so synergy occurred in this case.

PGA applied as TAKE OFF BOOSTER™. 1× Rate is the equivalent of 250 g PGA applied per hectare. NBPT applied as AGROTAIN ULTRA™. 1× Rate as 0.1% v/v AI (~1000 ppm). Calculated as follows: AGROTAIN ULTRA™ field rate: 3.0 quarts Agrotain/ton granular urea=2.84 L/907 kg. NBPT A.I. in AGROTAIN ULTRA™: Concentration: 26.7% w/w; Density: 1.06 kg/L. NBPT A.I. applied at standard field rate: 2.839 L*1.06 kg/L=3.01 kg of Agrotain applied per ton (1 ton=907 kg). Percent AGROTAIN ULTRA™ applied: 3.01 kg AGROTAIN ULTRA™/907 kg Urea=0.332% Agrotain. Quantity of active content: 0.332*0.267=0.0886% as NBPT=886 ppm, rounded up to 0.1% (i.e., 1000 ppm).

Example 4: Field Trial Protocol

Study Objective:

Determine efficiency gained in application of VLS 8300-02 and VLS 3000-01 with side-dress nitrogen on corn.

Site Selection

Select a site(s) for this trial with a typical crop rotation for the area.

Seed Selection

Select a commonly used hybrid of the appropriate maturity with the highest yield potential for the site. No specific characteristics or genetic traits are required, thus select a hybrid with appropriate disease and pest traits for the site selected. The seed should be treated with a fungicide/insecticide seed treatment that will minimize seedling disease and insect pest pressure.

Provide following information for the variety selected:
  Seed Company
  Hybrid
  Maturity
  Trait package
  Base Seed treatment on the seed before any additional treatment applied Agronomic Practices Use commonly accepted production practices; tillage, fertility, planting, weed, insect and disease control for the site selected. If any unusual conditions develop during the growing season such as unusual pest or disease infestations, treat appropriately to minimize impact on the crop and note for the final report.

Provide the following information:
    Tillage (conventional, minimum or no-till)
    Planting date
    Harvest date
    Product, timing, and rate for non-treatment related fertilizer applications
    Product, timing, and rate for pesticide applications
    Report of any unusual occurrences/conditions Experimental Design Use a minimum plot size of 4 rows×50' long arranged in a randomized complete block (RCB) design with at least 5 replications (harvest center 2 rows for yield data).

Treatment Details

Treatments supplied are all non-hazardous, and do not require crop destruction. Harvested grain can be disposed of as allowed based on the traits in the seed. Shake all liquid materials thoroughly before mixing for application. See MSDS shipped with materials for additional handling instructions.

Treatments
    Read instructions for each treatment completely and carefully before mixing or applying to the seed, as measurements and units may vary.
    Shake all liquid components well, before mixing and applying.
    All treatments should receive the same starter fertilizer package and the same early season fertilizer.
    Total fertilizer applied to treatments should be 80% of recommended N for yield goal.
    40-50 gallons of UAN is negotiable, please ensure N is limiting.
    Mix VLS 8300-02 in with UAN at a rate of 0.5% v/v or 2 quarts per 100 gallons; mix vigorously.
    Mix VLS 3000-01 in with UAN at 6, 12, or 24 oz. per acre equivalent; mix vigorously.
    When making combined treatments, do not mix VLS 8300-02 and VLS 3000-01; first mix in VLS 8300-02 until UAN is homogenous; then add VLS 3000-01.
    Application of side-dress is preferred to be as close to the stalks as possible at V-6 to V-8.
    Treatment 1: Untreated Control
        No UAN at Side-dress
    Treatment 2: Control
        UAN Only
        Applied side-dress at a rate of 50 gal per acre equivalent
    Treatment 3: UAN+VLS 8300-02
        Applied side-dress at a rate of 50 gal per acre equivalent
        VLS 8300-02 is added to the UAN at a rate of 0.5% v/v or 2 quarts per 100 gallons
    Treatment 4: UAN+VLS 3000-01
        Applied side-dress at a rate of 50 gal per acre equivalent
        VLS 3000-01 is added to UAN at a rate of 6 oz/acre
    Treatment 5: UAN+VLS 3000-01
        Applied side-dress at a rate of 50 gal per acre equivalent
        VLS 3000-01 is added to UAN at a rate of 12 oz/acre
    Treatment 6: UAN+VLS 3000-01
        Applied side-dress at a rate of 50 gal per acre equivalent
        VLS 3000-01 is added to UAN at a rate of 24 oz/acre
    Treatment 7: UAN+VLS 3000-01+VLS 8300-02
        Applied side-dress at a rate of 50 gal per acre equivalent
        VLS 3000-01 is added to UAN at a rate of 6 oz/acre
        VLS 8300-02 is added to the UAN at a rate of 0.5% v/v or 2 quarts per 100 gallons
    Treatment 8: UAN+VLS 3000-01+VLS 8300-02
        Applied side-dress at a rate of 50 gal per acre equivalent
        VLS 3000-01 is added to UAN at a rate of 12 oz/acre
        VLS 8300-02 is added to the UAN at a rate of 0.5% v/v or 2 quarts per 100 gallons
    Treatment 9: UAN+VLS 3000-01+VLS 8300-02
        Applied side-dress at a rate of 50 gal per acre equivalent
        VLS 3000-01 is added to UAN at a rate of 24 oz/acre
        VLS 8300-02 is added to the UAN at a rate of 0.5% v/v or 2 quarts per 100 gallons Data to Collect
    Photographs of any visual differences
    Yield
    Test Weight
    % moisture
    Grain sample Take pictures of any unusual conditions in the plots. Record any other observations regarding the condition of the trial or individual treatments in a timely manner.

Grain Sampling

Grain Samples are to be collected at harvest, preferably from combine. Hand shelled samples are acceptable where the combine is not equipped for grab samples.

All technical and scientific terms used herein have the same meaning. Efforts have been made to ensure accuracy with respect to numbers used (e.g., amounts, temperature, etc.) but some experimental errors and deviations should be accounted for.

Throughout this specification and the claims, the words "comprise," "comprises," and "comprising" are used in a nonexclusive sense, except where the context requires otherwise. It is understood that embodiments described herein include "consisting of" and/or "consisting essentially of" embodiments.

As used herein, the term "about," when referring to a value is meant to encompass variations of, in some embodiments ±5%, in some embodiments ±1%, in some embodiments ±0.5%, and in some embodiments ±0.1% from the specified amount, as such variations are appropriate to perform the disclosed methods or employ the disclosed compositions.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges which may independently be included in the smaller rangers is also encompassed, subject to any specifically excluded limit in the stated range. Where the stated range includes one or both of the limits, ranges excluding either or both of those included limits are also included.

Many modifications and other embodiments set forth herein will come to mind to one skilled in the art to which this subject matter pertains having the benefit of the teachings presented in the foregoing descriptions and the associated figures. Therefore, it is to be understood that the subject matter is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A composition comprising pyroglutamic acid (PGA) and N-(n-butyl)-thiophosphoric triamide (NBPT), wherein the pyroglutamic acid is present in an amount from about 12% w/w to about 36% w/w of the composition and the NBPT is present in an amount from about 13% w/w to about 40% w/w of the composition; and wherein the pyroglutamic acid and NBPT are present in synergistically effective amounts for increasing percent (%) nitrogen and/or percent (%) phosphorus content in plant tissue.

2. The composition of claim 1, wherein the pyroglutamic acid is L-pyroglutamic acid.

3. The composition of claim 1, wherein the pyroglutamic acid is a mixture of L- and D-pyroglutamic acid in a ratio of L to D of from about 80:20 to about 97:3.

4. The composition of claim 1, further comprising:
(a) soluble potash and a preservative; or
(b) N-methyl-2-pyrrolidone, potassium hydroxide and/or 1,2-propanediol.

5. A method of increasing percent nitrogen of plant tissue compared to an untreated plant, the method comprising applying the composition of claim 1.

6. The method of claim 5, wherein said percent nitrogen is increased from about 2% to about 8%.

7. A formulation comprising the composition of claim 1 and an agriculturally acceptable excipient.

8. The formulation of claim 7, wherein the formulation is a type selected from the group consisting of emulsifiable concentrate, soluble concentrate, oil-in-water emulsion, microemulsion, oil based suspension concentrate, suspension concentrate, and dispersible concentrate.

9. A method of increasing grain crude protein (%) of a plant comprising applying pyroglutamic acid and NBPT to the plant or an area adjacent to the plant, wherein the pyroglutamic acid is present in an amount from about 12% w/w to about 36% w/w and the NBPT is present in an amount from about 15% w/w to about 35% w/w; and wherein the pyroglutamic acid and the NBPT are present in synergistically effective amounts for increasing grain crude protein (%) of a plant.

10. The method of claim 9, wherein the pyroglutamic acid and the NBPT are applied simultaneously as a single composition.

11. The method of claim 9, wherein the applying comprises contacting PGA at a rate of about 75 g/ha to about 300 g/ha, and NBPT at about 300 g/ha to about 2270 g/ha.

12. The method of claim 9, wherein said plant is selected from the group consisting of cereals, wheat, barley, oats, triticale, rye, rice, maize, soya beans, potatoes, vegetables, peanuts, cotton, oilseed rape, and fruit plants.

13. The method of claim 9, wherein crude protein (%) is increased from about 3% to about 25% as compared to an untreated plant.

14. The method of claim 9, wherein the pyroglutamic acid and the NBPT are in a composition and the composition further comprises potassium hydroxide, soluble potash and a preservative.

15. The method of claim 9, wherein the pyroglutamic acid is L-pyroglutamic acid; or the pyroglutamic acid is a mixture of L- and D-pyroglutamic acid in a ratio of L to D of from about 80:20 to about 97:3.

* * * * *